United States Patent [19]

Hattori

[11] Patent Number: 4,560,369

[45] Date of Patent: Dec. 24, 1985

[54] BELT TYPE CONTINUOUS REDUCTION GEAR MECHANISM

[75] Inventor: Torao Hattori, Wako, Japan

[73] Assignee: Honda Giken Kogyo Kabushiki Kaisha, Tokyo, Japan

[21] Appl. No.: 428,715

[22] Filed: Sep. 30, 1982

[30] Foreign Application Priority Data

Dec. 10, 1981 [JP] Japan .................................. 56-198796

[51] Int. Cl.$^4$ ............................................. F16H 11/04
[52] U.S. Cl. ......................................................... 474/28
[58] Field of Search .................................... 474/28, 11

[56] References Cited

U.S. PATENT DOCUMENTS

4,292,031  9/1981  Rattunde ........................ 474/28 X

Primary Examiner—James A. Leppink
Assistant Examiner—Frank McKenzie
Attorney, Agent, or Firm—Armstrong, Nikaido, Marmelstein & Kubovcik

[57] ABSTRACT

A belt type continuous reduction gear mechanism, in which a V-belt is made to run under tension between drive and driven V-pulleys each equipped with a fixed pulley half and a movable pulley half made movable back and forth relative to the fixed half for adjusting an effective radius. The drive and driven V-pulleys are equipped with actuators for moving the respective pulley halves thereof back and forth. There is interposed between the actuators a coaction mechanism for effecting the coactions of the same.

7 Claims, 3 Drawing Figures

FIG.1

BELT TYPE CONTINUOUS REDUCTION GEAR MECHANISM

BACKGROUND OF THE INVENTION

1. Field of the Invention

The present invention relates to a belt type continuous reduction gear mechanism in which a V-belt is made to run under tension between such drive and driven V-pulleys as are each equipped with a fixed pulley half and a movable pulley half made movable back and forth relative to the fixed half for adjustment of an effective radius.

2. Description of the Prior Art

In the continuous reduction gear mechanism of the aforementioned type according to the prior art, there has been widely adopted a one-side following system in which only the drive V-pulley is equipped with an actuator for moving the movable pulley half back and forth so that the forward and backward movements of the movable pulley half at the drive side may be transmitted during reduction through the V-belt to the movable pulley half at the driven side thereby to make the latter move back and forth. The one-side following system experiences disadvantageous phenomena such as deformation, heat generation or wear, because its V-belt is subjected to an excessive tension, so that the V-belt has not only its transmission efficiency remarkably deteriorated but also its lifetime shortened. That following system has another defect that the movable pulley half at the driven side has its following operation delayed to degrade the running performance of a vehicle having such particular system.

SUMMARY OF THE INVENTION

It is, therefore, an object of the present invention to provide an effective continuous reduction gear mechanism of the aforementioned type, which is enabled to improve the transmission efficiency and lifetime of the V-belt, to eliminate the delay in the reduction and to improve the vehicular running performance by making the movable halves of both the drive and driven V-pulleys simultaneously movable back and forth through respective actuators.

Another object of the present invention is to provide the continuous reduction gear mechanism of the aforementioned type, which is enabled to prevent the V-belt from being slackened to have its lifetime elongated by applying a pre-tension to the V-belt when the actuators are not in operation.

A further object of the present invention is to provide a continuous reduction gear mechanism of the aforementioned type, which is enabled to improve the durabilities of bearings for bearing either the actuators or pulley shafts on a casing.

A further object of the present invention is to provide a continuous reduction gear mechanism of the aforementioned type, which is enabled to elongate the lifetime of the V-belt and to make the power transmission efficient by ensuring the continuous reduction and which has its control system made compact.

A further object of the present invention is to provide a continuous reduction gear mechanism of the aforementioned type, which is enabled to reduce the size of the drive V-pulley by setting the reduction range of the drive V-pulley at a relatively small value thereby to reduce the external diameter of that pulley and to retain the necessary reduction ratio by compensating the shortage in the reduction range of the drive V-pulley by means of an auxiliary reduction gear mechanism.

A further object of the present invention is to provide a continuous reduction gear mechanism of the aforementioned type, which is enabled to shorten the inter-bearing sizes of the drive and driven V-pulleys and to make their maintenances efficient.

A further object of the present invention is to provide a continuous reduction gear mechanism of the aforementioned type, which is enabled to reduce the external size of the casing accommodating the drive and driven V-pulleys.

A further object of the present invention is to reduce the size of a start clutch, to which the aforementioned continuous reduction gear mechanism is to be connected, and to reduce the operating load thereupon thereby to smoothen and maintain the operation of the start clutch in a normal state at all times by constructing that clutch of a hydraulic type multi-disc clutch.

A further object of the present invention is to improve the durability of a passage through which working oil is to be supplied to the start clutch.

According to the present invention, the objects thus far described can be achieved by providing a continuous reduction gear mechanism of V-belt type, in which a V-belt is made to run under tension between drive and driven V-pulleys each equipped with a fixed pulley half and a movable pulley half made movable back and forth relative to said fixed half for adjustment of an effective radius, said reduction gear mechanism being characterized in that said drive and driven V-pulleys are equipped with actuators for moving the respective pulley halves thereof back and forth, and in that there is interposed between said actuators a coaction mechanism for effecting the coactions of the same.

The aforementioned and other objects, features and advantages of the present invention will become apparent from the following detailed description of a preferred embodiment with reference to the accompanying drawings.

DESCRIPTION OF THE PREFERRED EMBODIMENT

The present invention will be described in the following in connection with one embodiment thereof, in which it is applied to a motorcycle, with reference to the accompanying drawings. With first reference to FIG. 1, the power unit Pu of the motorcycle is constructed of: an engine E; a start clutch Sc of hydraulic multi-disc type connected outside of the engine E to the crankshaft 1 of the same; a hydraulic V-belt type continuous reduction gear mechanism Tm disposed outside of and connected to the start clutch Sc; and an auxiliary reduction gear mechanism Ta having a plurality of or two (in the shown embodiment) gear trains and disposed in and connected to the continuous reduction bear mechanism Tm, all of which are accommodated in a casing C supported on the notshown body of the motorcycle.

Figure 2:
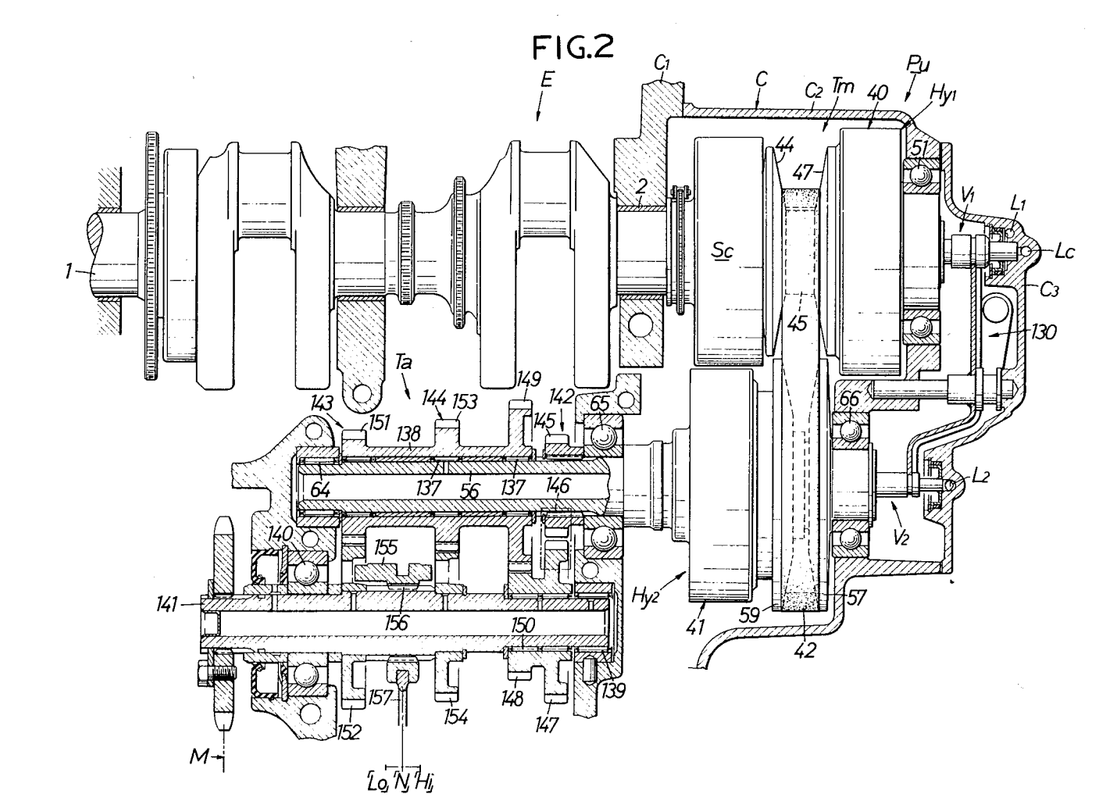
FIG. 2 is a partially and longitudinally sectional top plan view showing a power unit in the power transmission system.

The casing C is divided, as shown in FIG. 2, into a main case $C_1$ accommodating both the crank portion of the crankshaft 1 of the engine E and the auxiliary reduction gear mechanism Ta, an auxiliary case $C_2$ abutting against the outer side of the main case $C_1$ and accommodating both the continuous reduction gear mechanism $T_m$ equipped with drive and driven V-pulleys 40 and 41 and a V-belt 42 and the start clutch $S_c$, and a cover $C_3$ closing the outer side of that auxiliary case $C_2$ and accommodating a coaction mechanism 130 for the drive and driven V-pulleys 40 and 41. Moreover, the crankshaft 1 and other various rotary shafts of the power unit Pu are all arranged in parallel with the axis of a rear wheel Wr, which is rotatably suspended from the notshown motorcycle body at the back of the power unit Pu, such that the output shaft of the power unit Pu, i.e., the output shaft 141 of the auxiliary reduction gear mechanism Ta drives the rear wheel Wr through a chain transmission mechanism M.

Figure 1:
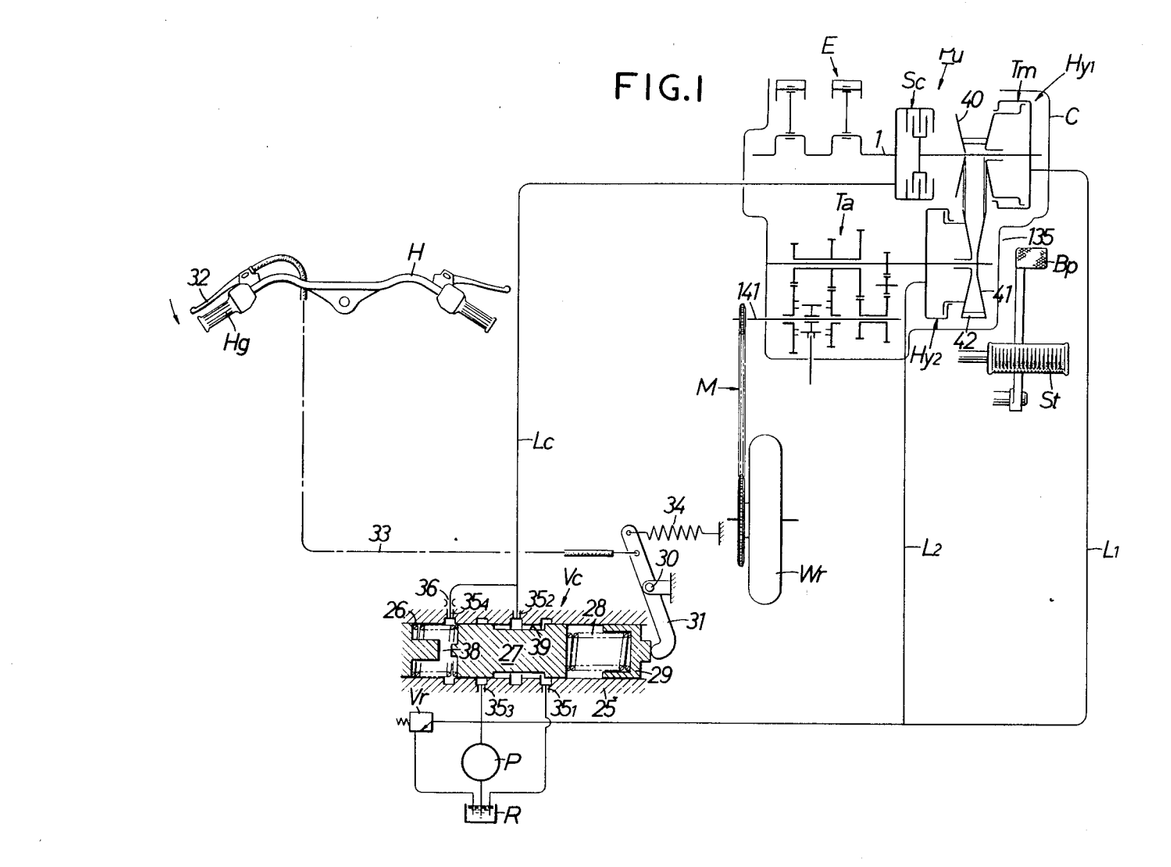
FIG. 1 is a schematic top plan view showing a power transmission system of a motorcycle.

In order to supply the start clutch Sc and the continuous reduction gear mechanism Tm with working oil, a control line Lc leading from a clutch valve Vc is connected with the start clutch Sc, and first and second lines $L_1$ and $L_2$ leading from an oil pump P acting as an oil pressure source are connected with the drive and driven portions of the continuous reduction gear mechanism Tm, respectively.

In FIG. 1, incidentally, reference letters Vr indicate a relief valve for the oil pump P, and letter R indicates an oil sump which is formed in the bottom of the casing C.

Figure 3:
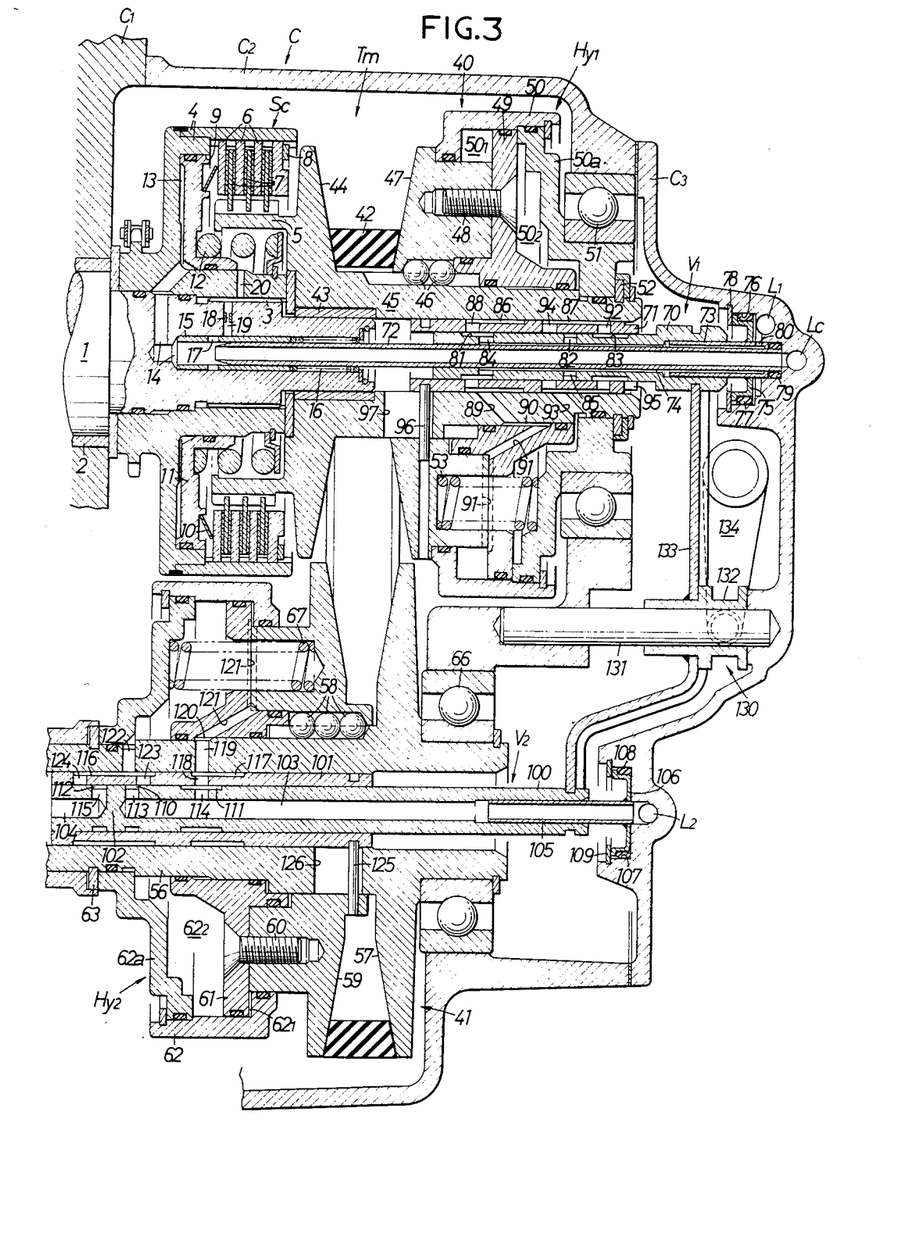
FIG. 3 is an enlarged longitudinally sectional top plan view showing a V-belt type continuous reduction gear mechanism in the power unit.

The constructions of the respective portions of the power unit Pu will be consecutively described with reference to FIGS. 2 and 3.

First of all, the start clutch Sc will be described in the following. This start clutch Sc is mounted on the crankshaft 1 adjacent to the outer side of the most righthand bearing 2 which bears the crankshaft 1 functioning as a rotary shaft. That start clutch Sc is constructed of: an outer clutch member 4, which is splined at 3 to the crankshaft 1, and an inner clutch member 5 which is made integral with the fixed pulley half 44 of the drive V-pulley 40, which will be described hereinafter. Between those outer and inner clutch members 4 and 5, there are interposed a plurality of drive friction discs 6, which are slidably splined to the outer clutch member 4, and a plurality of driven friction discs 7, which are slidably splined to the inner clutch member 5, such that the friction discs 6 and 7 are alternately positioned in a coextensive manner. On the outer clutch member 4, there is retained a pressure-receiving ring 8 for restricting the outermost drive friction disc 6 from moving to the outside. The outer clutch member 4 is formed at the opposite side to that pressure-receiving ring 8 with a hydraulic cylinder 9, in which there is slidably fitted such a piston 11 as faces the innermost drive friction disc 6 through a dish-shaped buffer spring 10. That piston 11 is biased in the backward direction, i.e., apart from the groups of the friction discs 6 and 7 by the action of a return spring 12 which is disposed inside of the inner clutch member 5. That hydraulic cylinder 9 has its pressure oil chamber 13 supplied with the working oil from the aforementioned control line Lc by way of a working oil passage 14 which is formed in the axial end portion of the crankshaft 1.

Thus, the hydralic cylinder 9 and the piston 11 constitute together a hydraulic actuator mechanism. When the oil pressure chamber 13 is supplied with the working oil under a high pressure, the piston 11 receives that oil pressure to advance, while compressing the return spring 12, so that it thrusts the grouped drive and driven friction discs 6 and 7 toward the pressure-receiving ring 8 thereby to frictionally couple the adjoining friction discs 6 and 7 through a partially clutch-applied state. Under this clutch-applied state, the power transmitted from the crankshaft 1 to the outer clutch member 4 is further transmitted through the two groups of the friction discs 6 and 7 to the inner clutch member 5 and further to the continuous reduction gear mechanism Tm at the subsequent step. If the working oil is released from the hydraulic cylinder 9, on the other hand the piston 11 is retracted by the elastic force of the return spring 12 so that the frictional couplings between the friction discs 6 and 7 are released (to a clutch-blocked state) to interrupt the aforementioned power transmission.

The start clutch Sc adopts the wet type in which the friction discs 6 and 7 are cooled down with the working oil. Now, if the cooling oil to be supplied to the friction discs 6 and 7 is excessive, trailing phenomena are caused, when the clutch is blocked, between the friction discs 6 and 7 by the viscosity of the cooling oil whereas slippage is liable to take place, when the clutch is applied, between the friction discs 6 and 7. If the cooling oil is short, on the contrary, the respective friction discs 6 and 7 are undesirably overheated during the partially applied operation in which much frictional heat is generated. Therefore, the flow rate of the cooling oil to be supplied is required to be controlled at a zero or low level, when the clutch is blocked or connected, and at a high level when the clutch is partially applied. For this control, there is provided a flow regulating valve 15.

This flow regulating valve 15 is made to have a cylindrical shape and is slidably fitted in the aforementioned working oil passage 14 of the crankshaft 1 so that said valve 15 has its lefthand end face subjected to the oil pressure in the working oil passage 14 and its righthand end face subjected to the atmospheric pressure and the elastic force of a return spring 16. That flow regulating valve 15 is formed with a valve port 17 which has communication with the working oil passage 14. The crankshaft 1 is formed with a first oil port 18 with an orifice 18, which has communication with the aforementioned valve port 17 when said valve 15 is moved to a predetermined righthand position. Moreover, the outer clutch member 4 is formed with a second oil port 20 which always effects communication of the first oil port 19 with the inside of the inner clutch member 5 through the spline 3. The orificed first oil port 19, the spline 3 and the second oil port 20 form together a cooling oil passage which is branched from the working oil passage 14.

Thus, during the clutch-blocked operation in which the working oil passage 14 is under a low pressure, the regulating valve 15 is retained at its lefthand limit by the force of the return spring 16 so that the communication between the valve port 17 and the first oil port 19 is either blocked, as shown, or suitably throttled, whereby the flow rate of the cooling oil to be supplied from the working oil passage 14 to the start clutch Sc is regulated to a zero or low level. When the oil pressure in the working oil passage 14 is boosted to such a level as to invite the partially clutch-applied state, the regulating valve 15 is moved rightwardly, while compressing the return spring 16, by the boosted oil pressure to establish communication of the valve port 17 with the first oil port 19, whereby the cooling oil is sufficiently supplied from the working oil passage 14 to the start clutch Sc by way of the valve port 17 and the first and second oil ports 19 and 20. The maximum flow rate of the cooling oil at this time is regulated by the action of the orifice 18. If the oil pressure in the working oil passage 14 is further boosted to invite the clutch-applied state so that the regulating valve 15 is further moved to the right, the communication between the valve port 17 and the first oil port 19 is again either blocked or suitably throttled, whereby the flow rate of the cooling oil is again regulated to zero or low level.

Reverting to FIG. 1, the description will be made upon the clutch valve Vc for operating the aforementioned start clutch Sc. Into a cylindrical valve housing 25 having its one end closed, there are consecutively inserted a return spring 26, a valve spool 27, a pressure regulating valve 28 and a push plate 29. To this push plate 29 at the outermost position, there is connected one end of an actuating lever 31 which has its central portion supported by a fixed pivot pin 30. To the other end of the actuating lever 31, there are connected both a control wire 33, which leads to a clutch lever 32 attached to a steering handle H, and an actuating spring 34. This actuating spring 34 has a stronger force than the aforementioned pressure regulating spring 28 so that it can push the pressure regulating spring 28 through the actuating lever 31 and the push plate 29 in accordance with the release of the clutch lever 32 thereby to increase the set load upon the spring 28.

The valve housing 25 is formed with first to fourth ports $35_1$ to $35_4$ which are opened in the inner wall thereof such that they are arranged side by side from the pressure regulating spring 28. The first port $35_1$ has communication with the oil sump R; the second port $35_2$ provides a lead to the control line Lc; the third port $35_3$ has communication with the oil pump P; and the fourth port $35_4$ has communications with not only the control line Lc through an orifice 36 but also with a reaction oil pressure chamber 38 which is formed in the valve housing 25 for accommodating the return spring 26. On the other hand, the valve spool 27 is formed with an annular groove 39 which is sized and positioned to switch the communication of the aforementioned second port $35_2$ with the first or third port $35_1$ or $35_3$.

Thus, if the actuating lever 31 is sufficiently retracted from the push plate 29 against the force of the actuating spring 34, as shown in FIG. 1, by pulling the clutch lever 32 toward the steering handle H, the valve spool 27 is moved to the right by the return spring 26 to close the third port $35_3$ but to establish the communication between the first and second ports $35_1$ and $35_2$. As a result, the pressure in the hydraulic cylinder 9 of the start clutch Sc is released into the oil sump R so that the start clutch Sc comes into its blocked state.

When the operating force of the clutch lever 32 is gradually released so that the push plate 29 is forced to push the pressure regulating valve 28 by the actuating spring 34, the valve spool 27 is moved to the left to close the first port $35_1$ but to establish the communication between the second and third ports $35_2$ and $35_3$ so that the oil discharged from the oil pump P is introduced into the control line Lc. If the oil pressure of the control line Lc is accordingly boosted, this boosted pressure is introduced through the orifice 36 into the reaction oil pressure chamber 38 so that the valve spool 27 is forced to return to the right to a position in which the pusing force of that oil pressure is balanced with the set load of the pressure regulating spring 28. Therefore, the oil pressure of the control line Lc, i.e., the applying oil pressure of the start clutch Sc can be boosted in accordance with such increase in the set load of the pressure regulating spring 28 as accords with the returning motion of the clutch lever 32.

If there is used in the aforementioned manner the clutch valve Vc which can vary the applying oil pressure for the start clutch Sc proportionately of the squeezed extent of the clutch lever 32, the oil pressure for applying the start clutch Sc can be set at a sufficiently high level substantially independently of the force for operating the clutch lever 32, even if that force is lightly set, whereby the size of the start clutch Sc can be reduced. This size reduction is further promoted by mounting the start clutch Sc on the crankshaft 1 which has the highest r.p.m. and the lowest torque of the power unit Pu, as has been described hereinbefore. Moreover, since the applying oil pressure of the start clutch Sc after the application is proportional to the r.p.m. of the engine E, it is possible to attain the clutch load matching with the engine torque thereby to improve the durability of the clutch system.

The continuous reduction gear mechanism Tm will be described in the following. This continuous reduction gear mechanism is composed mainly of: the drive V-pulley 40 which is mounted on the crankshaft 1 adjacent to the righthand side of the start clutch Sc; the driven V-pulley 41 which is arranged at the back of and adjacent to the drive V-pulley 40; and the V-belt 42 which is made to run between the two V-pulleys 40 and 41.

The drive V-pulley 40 has its external diameter so reduced to set its reduction ratio range at a relatively small value as to be substantially equal to that of the outer clutch member 4 of the start clutch Sc. The drive V-pulley 40 is composed of: the fixed pulley half 44 which is rotatably borne on the righthand end portion of the crankshaft 1 by means of a bearing 43; and the movable pulley half 47 which is slidably connected through two ball keys 46 to a hollow drive pulley shaft 45 made integral with that fixed pulley half 44 and disposed coaxially with the crankshaft 1. On the rear portion of that movable pulley half 47, there is fixed by means of screws 48 a piston 49. A hydraulic cylinder 50 accommodating that piston 49 has its rear wall plate 50a borne in the auxiliary case $C_2$ by means of a ball bearing 51 and connected to the drive pulley 45 by means of a retainer ring 52 acting as a pressure-receiving member. The piston 49 partitions the inside of the hydraulic cylinder 50 into a first oil pressure chamber $50_1$ at the side of the fixed pulley half 44 and a second oil pressure chamber $50_2$ at the opposite side. The pressure-receiving face of the piston 49 is formed to be wider at the second oil pressure chamber $50_2$ than at the first oil pressure chamber $50_1$.

Therefore, if an equal oil pressure is introduced into the two oil pressure chambers $50_1$ and $50_2$, the piston 49 is moved to the left by the oil pressure difference due to the difference between the right and left pressure-receiving areas, whereby the movable pulley half 47 is moved forward toward the fixed pulley half 44 so that the effective radius of the drive V-pulley 40, i.e., the contact area with the V-belt 42 can be enlarged. On the other hand, if the oil pressure of the second oil pressure chamber $50_2$ is released in a state in which the oil pressure is applied to the first oil pressure chamber $50_1$, the piston 49 is moved to the right by the oil pressure in the first oil pressure chamber $50_1$, whereby the movable pulley half 47 is retracted apart from the fixed pulley half 44 so that the effective radius of the drive V-pulley 40 can be reduced. Thus, the piston 49 and the hydraulic cylinder 50 constitute together a hydraulic actuator Hy1 for moving the movable pulley half 47 back and forth relative to the fixed pulley half 44. For the hydraulic operation of the piston 49 thus far described, there is disposed in the drive pulley shaft 45 a first control valve $V_1$, the detail of which will be described hereinafter.

The hydraulic cylinder 50 is placed in an integral relationship with the fixed pulley half 44, too, because its rear wall plate 50a is connected to the drive pulley shaft 45 by means of the retainer ring 52, as has been described hereinbefore. With this relationship, the thrust load, which is to be exerted between the fixed pulley half 44 and the hydraulic cylinder 50 in accordance with the hydraulic operation of the piston 49, can be transmitted to and borne on the drive pulley shaft 45. As a result, the load upon the ball bearing 51 for rotatably bearing the hydraulic cylinder 50 is lightened so that the durability of the same can be improved.

On the other hand, the driven V-pulley 41 is composed of: a fixed pulley half 57, which is made integral with a hollow driven pulley shaft 56 arranged in parallel with the drive pulley shaft 45, and a movable pulley half 59 which is axially slidably connected to the follower pulley shaft 56 by means of three ball keys 58. Moreover, the fixed pulley half 57 is arranged at the back of the externally positioned movable pulley half 47 of the drive V-pulley 40, and the movable pulley half 59 is arranged at the back of the internally positioned fixed pulley half 44 of the same. To the back of the movable pulley half 59, there is fixed by means of screws 60 a piston 61. A hydraulic cylinder 62 accommodating that piston 61 is connected to the driven pulley shaft 56 by means of a retainer ring 63 acting as a pressure-receiving member. The piston 61 partitions the inside of the hydraulic cylinder 62 into a first oil pressure chamber $62_1$ at the side of the fixed pulley half 57 and a second oil pressure chamber $62_2$ at the opposite side. The pressure-receiving face of the piston 61 is formed to be wider at the second oil pressure chamber $62_2$ than at the first oil pressure chamber $62_1$.

Therefore, if an equal pressure is introduced into the two oil pressure chambers $62_1$ and $62_2$, the piston 61 is moved to the right by the oil pressure difference due to the difference between the right and left pressure-receiving areas, whereby the movable pulley half 59 is moved forward to approach the fixed pulley half 57 so that the effective radius of the driven V-pulley 41 can be enlarged. On the other hand, if the oil pressure of the second oil pressure chamber $62_2$ is released in a state in which the oil pressure is applied to the first oil pressure chamber $62_1$, the piston 61 is moved to the left by the oil pressure of the first oil pressure chamber $62_1$, whereby the movable pulley half 59 is retracted apart from the fixed pulley half 57 so that the effective radius of the driven V-pulley 41 can be reduced. Thus, the piston 61 and the hydraulic cylinder 62 constitute together a hydraulic actuator Hy2 for moving the movable pulley half 59 back and forth relative to the fixed pulley half 57. For the hydraulic operation of the piston 61 thus far described, there is disposed in the driven pulley shaft 56 a second control valve $V_2$, the detail of which will be described hereinafter.

The driven pulley shaft 56 is borne in the casing C at its righthand and lefthand end portions and at its central portion by means of bearings 64, 65 and 66. Between the central bearing 65 and the righthand bearing 66, moreover, the hydraulic cylinder 62 is placed in an integral relationship with the fixed pulley half 57 by means of the retainer ring 63 and the driven pulley shaft 56. With this relationship, the thrust load, which is to be exerted between the fixed pulley half 57 and the hydraulic cylinder 62 in accordance with the hydraulic operation of the piston 61, can be transmitted to and borne by the driven pulleyshaft 56. As a result, the load upon the bearings 65 and 66 can be lightened so that the durability of the same can be improved.

On the other hand, if the continuous reduction gear mechanism Tm is accommodated in the auxiliary case $C_2$, its inter-bearing size can be limited within the width of the auxiliary case $C_2$ to shorten the drive and driven pulley shafts 45 and 56 and to improve the durabilities of the same. Moreover, since the coaction mechanism 130 having a relatively high frequency for its maintenance is disposed outside of the casing C whereas the continuous reduction gear mechanism Tm having a next frequency is disposed at an intermediate position, their maintenances can be efficiently conducted.

Now, the description is changed to the first and second control valves $V_1$ and $V_2$ and to their surrounding oil passages.

The first control valve $V_1$ is composed of: a cylindrical follower valve spool 71, which is slidably fitted in the hollow drive pulley shaft 45; and a cylindrical main valve spool 70 which is slidably fitted in that follower valve spool 71. In the main valve spool 70, there are inserted inner and outer communication conduits 72 and 73 which are fitted the former in the latter. The inner communication conduit 72 extends to the right and left through the main valve spool 70 and has its lefthand end fitted in the crankshaft 1 through the flow regulating valve 15 to communicate with the working oil passage 14 and its righthand end connected to the aforementioned control line Lc which is formed in the cover $C_3$ of the casing C.

Moreover, the inner communication conduit 72 defines inside of the main valve spool 70 a cylindrical oil passage 74, which has communication with the aforementioned first oil line $L_1$ formed in the cover $C_3$ by way of the outer communication conduit 73.

Those two communication conduits 72 and 73 are connected partly by reducing the righthand end of the outer one 73 and by welding the righthand outer circumference of the inner one 72. Moreover, a mounting flange 75 is welded to the outer circumference of the outer communication conduit 73. The cover $C_3$ has its inner wall formed with a stepped oil port 76 of the first oil line $L_1$, which is aligned with the axis of the drive pulley shaft 45. The mounting flange 75 is fitted in the larger portion of the stepped oil port 76 by means of an O-ring 77 acting as an elastic seal member and is prevented from coming out by means of a retainer ring 78. On the other hand, the rightward protrusion of the inner communication conduit 72 is fitted in the reduced portion of the stepped oil port 76 by means of an O-ring 79 acting as an elastic seal member. Thus, the dual communication conduits 72 and 73 are supported in the cover $C_3$ in such a floating manner that they can follow the fluctuations of the center axes of the crankshaft 1 and the drive pulley shaft 45 thereby to prevent themselves, and the crankshaft 1 and the drive pulley shaft 45 from being worn due to the abutments inbetween. Incidentally, reference numeral 80 indicates a communication hole which is formed in the circumferential wall of said communication conduit 73 so as to establish communication between the stepped oil port 76 and the inside of the outer communication conduit 73.

The main valve spool 70 has its outer circumference formed with a pair of left and right annular oil supply grooves 81 and 82 and an annular oil release groove 83. The oil supply grooves 81 and 82 are made to communicate with the cylindrical oil passage 74 in the main valve spool 70 by way of holes 84 and 85. On the other hand, the follower valve spool 71 has its outer circumference formed with a pair of left and right annular oil grooves 86 and 87. The left oil groove 86 is made to always communicate not only with left oil supply groove 81 of the main valve spool 70 by way of a hole 88 but also with the first oil pressure chamber $50_1$ of the hydraulic cylinder 50 by way of a hole 89, an annular oil passage 90 and an oil passage 91. On the other hand, the right oil groove 87 is made to always communicate not only with the oil release groove 83 of the main valve spool 70 by way of a hole 92 but also with the second oil pressure chamber $50_2$ of the hydraulic cylinder 50 by way of a hole 93. Moreover, the follower valve spool 71 is formed with a hole 94 for the oil release system, which is made operative to provide and block the communication between the right oil groove 87 and the right oil supply groove 82 of the main valve spool 70, and a notched oil release port 95 for providing and blocking the communication between the oil release groove 83 of the main valve spool 70 and the inside of the casing C. Furthermore, the follower valve spool 71 is connected to the movable pulley half 47 by means of a coaction pin 96 which extends radially of the drive pulley shaft 45 so that it can move to the right and left together with the latter. That portion of the drive pulley shaft 45, into which the coaction pin 96 extends, is formed into such an elongated hole 97 as not to obstruct the rightward and leftward movements of the coaction pin 96.

The second control valve $V_2$ is composed of: a cylindrical follower valve spool 101, which is slidably fitted in the hollow follower pulley shaft 56; and a main valve spool 100 which is slidably fitted in that follower valve spool 101. The main valve spool 100 has its central portion formed with oil supply and release passages 103 and 104 which are isolated from each other by means of a partition 102. The oil supply passage 103 is made to communicate with the aforementioned second oil line $L_2$ formed in the cover $C_3$ by way of a communication conduit 105 inserted thereinto, whereas the oil release passage 104 is opened into the hollow portion of the follower pulley shaft 56, which has communication with the inside of the casing C.

The cover $C_3$ has its inner wall formed with an oil port 107 of the second oil line $L_2$, which is aligned with the axis of the follower pulley shaft 56. In that oil port 107, there is fitted by means of an O-ring 108 acting as an elastic seal member a mounting flange 106 which is welded to the outer circumference of the communication conduit 105 and which is prevented from coming out by means of a retainer ring 109. Thus, the communicating conduit 105 is supported in the cover $C_3$ in such a floating manner that it can follow the fluctuations of the axis of the follower pulley shaft 56 thereby to prevent the two members 56 and 105 from being worn due to their abutments.

On the other hand, the main valve spool 100 has its outer circumference formed with a pair of left and right annular oil supply grooves 110 and 111 and an annular oil release groove 112. Those oil supply grooves 110 and 111 are both made to communicate with the aforementioned oil supply passage 103 by way of holes 113 and 114, whereas the oil release groove 112 of the oil release system is made to communicate with the aforementioned oil release passage 104 by way of a hole 115. On the other hand, the follower valve spool 101 has its outer circumference formed with a pair of left and right annular oil grooves 116 and 117. This right oil groove 117 is made to always communicate not only with the right oil supply groove 111 of the main valve spool 100 by way of a hole 118 but also with the first oil pressure chamber $62_1$ of the hydraulic cylinder 62 by way of a hole 119, an annular oil passage 120 and an oil passage 121. The left oil groove 116 is made to always communicate with the second oil pressure chamber $62_2$ of the hydraulic cylinder 62 by way of a hole 122. On the other hand, the follower valve spool 101 is formed with holes 123 and 124 for providing and blocking the communications between the left oil groove 116, and the left oil supply groove 110 and the oil release groove 112 of the main valve spool 100. Moreover, the follower valve spool 101 is connected to the movable pulley half 59 by means of a coaction pin 125, which extends radially of the follower pulley shaft 56, so that it can move to the right and left together with the latter. That portion of the follower pulley shaft 56, into which the coaction pin 125 extends, is so formed with an elongated hole 126 as not to obstruct the rightward and leftward movements of the coaction pin 56.

Both the first and second control valves $V_1$ and $V_2$ are so connected to the coaction mechanism 130 that the movable pulley halves 47 and 59 at the drive and driven sides may operate in synchronism with each other. That coaction mechanism 130 is constructed of: a push pin 131, which is interposed between and in parallel with the two control valves $V_1$ and $V_2$; a shifter 132 which is slidably borne on that push pin 131; and a coaction rod 133 which has its middle portion fixed to the shifter 132 and both its ends connected to the main valves spools 70 and 100 of the two control valves $V_1$ and $V_2$. The aforementioned shifter 132 is operated by the swinging motions of a shift lever 134 which is pivotally supported by the casing C. On the other hand, the shift lever 134 is operated by the turning operation of the left grip Hg of the steering handle H of FIG. 1.

Here, the operations of both the control valves $V_1$ and $V_2$ will be described in the following. In case the shifter 132 is positioned at its righthand limit in which it abuts against the cover $C_3$, as shown in FIG. 3, the first control valve $V_1$ has its hole 94 closed by the main valve spool 70 to block the communication between the right oil supply groove 82 and the right oil groove 87 but to provide the communication between the oil release groove 83 and the oil release port 95. Since the left oil supply groove 81 and the left oil groove 86 are always held in a state to communicate with each other, on the contrary, the working oil pressure waiting in the cylindrical oil passage 74 is introduced into the first oil pressure chamber $50_1$ by way of the oil grooves 81, 86 and so on, whereas the second oil pressure chamber $50_2$ is opened into the oil release port 95 by way of the oil grooves 82, 87 and so on. As a result, the piston 11 is moved to the right by the oil pressure of the first oil pressure chamber $50_1$ until it holds the movable pulley half 47 at its rearmost limit.

In this case, moreover, the second control valve $V_2$ has its left oil supply groove 110 communicating with the left oil groove 116 by way of the hole 123 and its hole 124 closed by the main valve spool 100 thereby to block the communication between the oil release groove 112 and the left oil groove 116. Since the right oil supply groove 111 and the right oil groove 117 are always held in their communicating states, on the other hand, the working oil pressure waiting in the oil supply passage 103 is introduced into the first and second oil pressure chambers $62_1$ and $62_2$ of the hydraulic cylinder 62 so that the piston 61 is moved to the right by the oil pressure difference, as has been described hereinbefore, until it holds the movable pulley half 59 in its foremost limit.

Thus, since the effective radius of the drive V-pulley 40 is controlled to the minimum whereas the effective radius of the follower V-pulley 41 is controlled to the maximum, the former pulley 40 can drive the latter pulley 41 at the maximum reduction ratio.

Next, if the shift 132 is moved to the left, both the main valve spools 70 and 100 are simultaneously moved to the left by the action of the coaction rod 133. Moreover, when the hole 94 is opened by the leftward movement of the main valve spool 70 to provide the communication between the right oil supply groove 82 and the right oil groove 87 but to close the oil release port 95 by means of the main valve spool 70, then the working oil pressure of the cylindrical oil passage 74 is introduced into the second oil pressure chamber $50_2$, too, so that the piston 49 starts to be moved to the left by the oil pressure difference, as has been described hereinbefore, thereby to move the movable pulley half 47 forward. Then, this advance of the movable pulley half 47 is transmitted through the coaction pin 96 to the follower valve spool 71 so that this valve spool 71 is simultaneously moved to follow the main valve spool 70. In accordance with this following operation, the hole 94 and the oil release port 95 are closed by the main valve spool 70 so that the piston 49 and, accordingly, the movable pulley half 47 is stopped when the second oil pressure chamber $50_2$ is blocked from communicating with both the cylindrical oil passage 74 and the oil release port 95. In other words, the movable pulley half 47 can advance in accordance with the leftward movement of the main valve spool 70.

In accordance with this leftward movement of the main valve spool 100, on the other hand, the hole 123 is closed by the main valve spool 100 whereas the hole 124 is opened to provide the communication between the oil release groove 112 and the left oil groove 116 so that the oil pressure of the second oil pressure chamber $62_2$ is released into the oil release passage 104. As a result, the piston 61 starts to be moved to the left by the oil pressure of the first oil pressure chamber $62_1$ thereby to retract the movable pulley half 59. Then, the retraction of this movable pulley half 59 is transmitted through the coaction pin 125 to the follower spool valve 101 so that this valve 101 is simultaneously moved to accompany the main valve spool 100. By this accompanying operation, both the holes 113 and 114 are closed by the main valve spool 100 so that the second oil pressure chamber $62_2$ is blocked from its communication with both the oil supply passage 103 and the oil release passage 104. Then, the piston 61 and, accordingly, the movable pulley half 59 are stopped. In other words, the movable pulley half 59 can retract in accordance with the leftward movement of the main valve spool 100.

Thus, since the advance of the movable pulley half 47 of the drive V-pulley 40 and the retraction of the movable pulley half 59 of the driven V-pulley 41 are conducted in synchronism with each other, the reduction of the effective radius of the drive V-pulley 42 and the enlargement of the effective area of the driven V-pulley 41 conducted in synchronism with each other without any application of an excessive tension to the V-belt 42 so that the reduction ratio between the two V-pulleys 40 and 41 can be reduced without fail thereby to elongate the lifetime of the V-belt 42 and to efficiently effect the power transmission. Moreover, since the main and follower valve spools 70 and 71, and 100 and 101 are made internally and externally dual and are disposed in the hollow drive and follower pulley shafts 45 and 56, they can be made compact. Furthermore, since the main and follower valve spools 70 and 71, and 100 and 101 are slidably fitted in the rotating hollow drive and driven pulley shafts 45 and 56, respectively, they are smooth in motions while eliminating no fear that they come to a standstill. Furthermore, since the first oil pressure chambers $50_1$ and $62_1$ are always held in communication with the oil pump P whereas only the second oil pressure chambers $50_2$ and $62_2$ have their communications switched to the oil pump P or the oil release system, the main and follower valve spools 70 and 71, and 100 and 101 have their constructions simplified.

In the constructions thus far described, the hydraulic cylinder 50 of the drive V-pulley 40 is made to have a larger diameter than the hydraulic cylinder 62 of the driven V-pulley 41. According to these constructions, the hydraulic force to be received by the piston 49 at the drive side can always be made stronger than that to be received by the piston 61 at the driven side, even if the oil pressure is dropped, so that the responsiveness of the speed change can be effectively improved.

In the piston 49 of the drive V-pulley 40, moreover, the following inequality holds:

$$A_2 - A_1 > A_1,$$

if the pressure-receiving area at the side of the first oil pressure chamber $50_1$ is designated at $A_1$ and if the pressure-receiving area at the side of the second oil pressure chamber $50_2$ is designated at $A_2$.

In the piston 61 of the driven V-pulley 41, on the other hand, the following inequality holds:

$$B_2 - B_1 > B_1,$$

if the pressure-receiving area at the side of the first oil pressure chamber $62_1$ is designated at $B_1$ and if the pressure-receiving area at the side of the second oil pressure chamber $62_2$ is designated at $B_2$. As a result, the advancing forces of the respective movable pulley halves 47 and 59 by the oil pressures can always be made stronger than the retracting forces thereof. As a result, even if the forces for reducing the effective radii are applied to the respective movable pulley halves 47 and 59 by the centrifugal force acting upon the V-belt 42, the responsiveness to the speed changes in the directions to enlarge the effective radii of the movable pulley halves 47 and 59 can be improved.

In the hydraulic cylinders 50 and 62, moreover, there are disposed under compression the springs 52 and 67 which act as elastic members for urging the movable pulley halves 47 and 59 in their advancing directions, i.e., in the directions to have their effective radii enlarged. Those springs 53 and 67 function to apply a pre-tension to the V-belt 42 when no oil pressure is introduced yet into the respective hydraulic cylinders 50 and 62. As a result, it is possible to prevent any excessive shocking load from being exerted upon the v-belt 42 when in the starting operation thereby to elongate the lifetime of the V-belt 42. Moreover, since the elastic members, i.e., the springs 53 and 67 are accommodated in the hydraulic cylinders 50 and 62, no special space is required therefor so that the size of the continuous reduction gear mechanism can be effectively reduced.

Incidentally, if only one of the aforementioned springs 53 and 67 is provided, the pretension can be applied to the V-belt 42.

Since, in the auxiliary case C₂, the hydraulic actuator Hy1 of the drive V-pulley 40 is disposed in the outer front whereas the hydraulic actuator Hy2 of the driven V-pulley 41 is disposed at the inner back, the fixed pulley half 57 of the driven V-pulley 41 is necessarily disposed at the outer back of the same. Since the fixed pulley half 57 is equipped with no accessory such as the hydraulic cylinder 62, the casing C at the back of the fixed pulley half 57 is formed at its righthand outer rear portion with a recess 135 so that the contour of the casing C can be reduced. As shown in FIG. 1, a brake pedal Bp is disposed by making use of that recess 135. Thus, that brake pedal Bp can have its outward protrusion reduced or its protruding extent reduced. Incidentally, reference letter St appearing in the same Figure indicates a foot step.

On the other hand, the diagonal arrangements of the two hydraulic cylinders 50 and 62 with respect to the two V-pulleys 40 and 41 are advantageous because the external diameters of the respective hydraulic cylinders 50 and 62 can be freely set without any interference with the other hydraulic cylinders 62 and 50 even in case they are disposed in the vicinity of the two V-pulleys 40 and 41.

Next, the auxiliary reduction gear mechanism Ta will be described.

This auxiliary reduction gear mechanism Ta is constructed, as shown in FIGS. 1 and 2, of: an input shaft 138 which is borne on the driven pulley shaft 56 between the bearings 64 and 65 by means of a needle bearing 137; and the output shaft 141 which has both its end portions borne in the main case C₁ at the back of the input shaft 138 by means of a needle bearing 139 and a ball bearing 140. The input shaft 138 is connected in one hand to the driven pulley shaft 56 through a reduction gear train 142 and on the other hand to the output shaft 141 through low- and high-speed gear trains 143 and 144.

The reduction gear train 142 is composed of: a first small gear 145 which is splined to the driven pulley shaft 56; a first large gear 147 which is driven by that small gear 145 through an intermediate gear 146; a second small gear 148 which is made rotatable together with that large gear 147; and a second large gear 149 which is driven by that small gear 148. The first large gear 147 and the second small gear 148 made integral with each other are borne on the output shaft 141 by means of a needle bearing 150, whereas the second large gear 149 is integrated with one end of the input shaft 138. As a result, the rotations of the driven pulley shaft 56 are decelerated one step by the first gears 145 and 147 and the other step by the second gears 148 and 149 until they can be transmitted to the input shaft 138.

The low-speed gear train 143 is composed of: a drive gear 151 which is made integral with the input shaft 138; and a driven gear 152 which is rotatably borne on the output shaft 141 such that it is driven by the aforementioned gear 151. On the other hand, the high-speed gear train 144 is constructed of: a drive gear 153 which is made integral with the input shaft 138; and a driven gear 154 which is rotatably borne on the output shaft 141 such that it is driven by the aforementioned gear 153. Moreover, the reduction ratio is naturally set at a higher level for the lowspeed gear train 143 than for the high-speed gear train 144. To the output shaft 141, furthermore, there is slidably splined at 156 a shifter 155 which can be alternately coupled in a dog manner to the two driven gears 152 and 154. As a result, the shifter 155 has two shift positions, i.e., the slow position "Lo", in which it is coupled to the driven gear 152, and the fast position "Hi", in which it is coupled to the driven gear 154, and can additionally have a neutral position "N" in which it is coupled to neither the driven gears 152 and 154. This shifting operations of the shifter 155 are effected by a shift fork 157. Thus, if the shifter 155 is shifted to the position "Lo" or "Hi", either the low-speed gear train 143 or the high-speed gear train 144 is brought into its operative state so that reduction ratios of two high and low steps can be effected between the input and output shafts 138 and 141.

The auxiliary reduction gear mechanism Ta thus far described compensates the short reduction ratio range of the aforementioned continuous reduction gear mechanism Tm, which is caused by the reduction in the external diameter of the drive V-pulley 40. In other words, by the addition of the auxiliary reduction gear mechanism Ta, the drive and driven V-pulleys 40 and 41 can have their axial distance shortened as much as possible and their sizes reduced so that the power unit Pu can be accommodated compactly in the casing C while allowing the accompanying more or less sacrifice of the reduction ratio range of the continuous reduction gear mechanism Tm.

On the other hand, the external diameter of the start clutch Sc is determined by the number, the internal and external diameters and the surface pressures of the drive and driven friction discs 6 and 7. For example, the external diameter of the start clutch Sc can be reduced by increasing the number of those friction discs 6 and 7 so that their surface pressures may be augmented. With this construction, however, there arises a disadvantage that the operations are not smooth or that the operating load is augmented.

In the present invention, since the external diameter of the start clutch Sc is reduced to substantially the same as that of the drive V-pulley 40 and since the start clutch Sc is constructed of a hydraulic multi-disc clutch, the start clutch Sc has its size reduced and its operation smoothened, and its operating load is reduced.

What is claimed is:

1. A belt type continuous reduction gear mechanism, in which a V-belt is made to run under tension between drive and driven V-pulleys each equipped with a fixed pulley half and a movable pulley half made movable back and forth relative to said fixed half for adjusting an effective radius, wherein the improvement comprises:

fluid actuators disposed in said drive and driven V-pulleys, respectively, for moving said movable pulley halves of the same back and forth;

a control valve associated with each fluid actuator, for controlling respective amounts of movements of the movable pulley halves; and a coaction mechanism interposed between said control valves for effecting the coactions of the same.

2. A belt type continuous reduction gear mechanism as set forth in claim 1, wherein said actuators are constructed of hydraulic operating type, and wherein an elastic member for urging said movable pulley halves in directions to enlarge the effective radii is accommodated in at least one of said actuators.

3. A belt type continuous reduction gear mechanism as set forth in claim 1 or 2, wherein said fixed pulley halves include pulley shafts borne on a casing by means of bearings, wherein on said pulley shafts are arranged said movable pulley halves and the hydraulic actuators for moving said movable pulley halves back and forth relative to said fixed pulley halves and adjusting the effective radii, wherein said hydraulic actuators are equipped with pistons fixed to said movable pulley halves and hydraulic cylinders accommodating said pistons, and wherein there are interposed between said hydraulic cylinders and said pulley shafts pressure-receiving members for transmitting to said pulley shafts and for bearing thereon the thrust loads which are exerted between said fixed pulley halves and said hydraulic cylinders in accordance with the operations of said hydraulic actuators.

4. A belt type continuous reduction gear mechanism as set forth in claim 3, wherein said pulley shafts are made hollow, wherein the hydraulic cylinders of said hydraulic actuators are axially immovably arranged on said pulleys shafts and have the interiors of said cylinders partitioned by said pistons into first oil pressure chambers disposed on sides nearest said fixed pulley halves and second oil pressure chambers at the opposite sides thereof, wherein pressure-receiving faces of said pistons are made wider at the sides of said second oil pressure chambers than at the sides of said first oil pressure chambers, wherein there are disposed control valves in said hollow pulley shafts, which valves include such main valve spools as can slide in the axial directions of said hollow pulley shafts and such follower valve spools as are slidably fitted on the outer circumference of said main valve spools and are made coactive to always provide the communications of said first oil pressure chambers with an oil pressure source and to establish both the communications of said second oil pressure chambers with said oil pressure source by the one-way sliding movements of said main valve spools thereby to advance said movable pulley halves and the communications of said second oil pressure chambers with an oil release system by the sliding movements of said main valve spools in the other directions thereby to retract said movable pulley halves, and wherein said movable pulley halves and said follower valve spools are so connected that when said movable pulley halves advance or retract, said follower valve spools slide in accordance with the sliding distances of said main valve spools thereby to block said second oil pressure chambers from said oil pressure source and said oil release system.

5. A belt type continuous reduction gear mechanism as set forth in claim 4, wherein both the pressure-receiving faces of said pistons, facing said first and second oil pressure chambers, are so sized that the hydraulic thrusting forces to be exerted upon said pistons in the advancing directions are stronger than those to be exerted upon said pistons in the retracting directions.

6. The belt type continuous reduction gear mechanism of claim 1, wherein said control valves are disposed within hollow pulley shafts of the drive and driven V-pulleys.

7. The belt type continuous reduction gear mechanism of claim 6, wherein each of said control valves is a spool valve having a main valve spool and a follower valve spool concentric with one another.

* * * * *